United States Patent Office 3,461,051
Patented Aug. 12, 1969

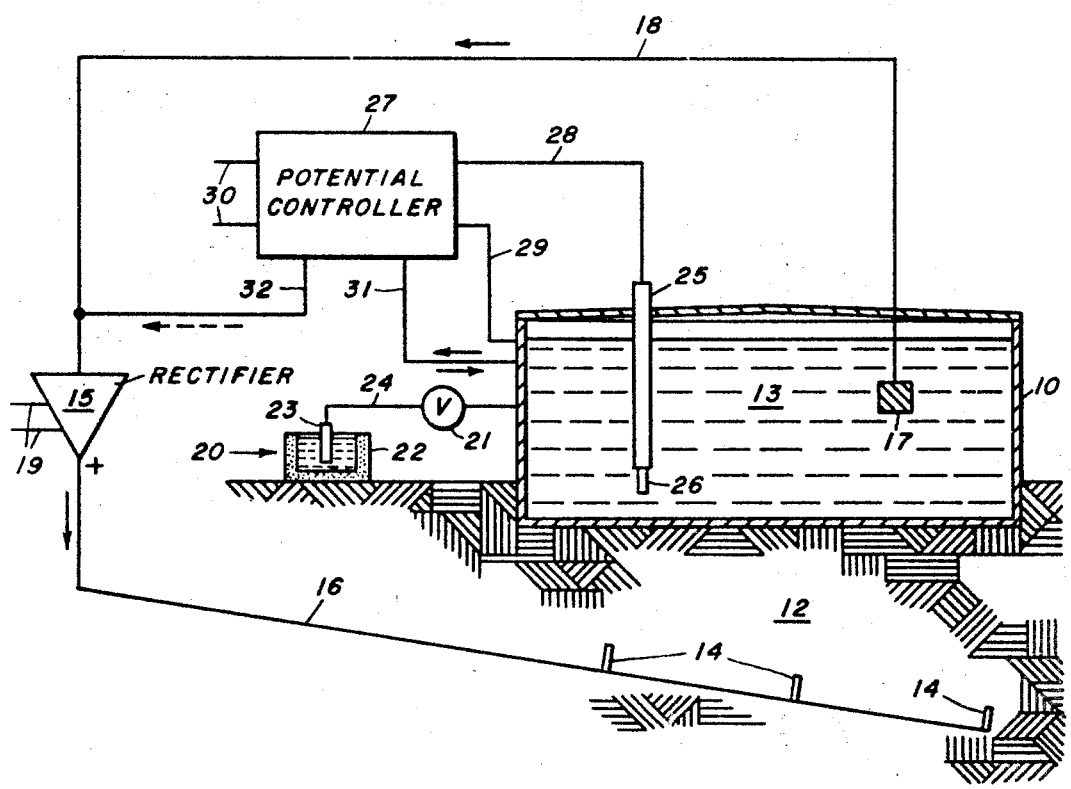

3,461,051
METHOD AND APPARATUS FOR PROTECTING WALLS OF A METAL VESSEL AGAINST CORROSION
John B. Vrable, Salem Township, Westmoreland, County, Pa., assignor to United States Steel Corporation, a corporation of Delaware
Filed Feb. 18, 1966, Ser. No. 528,490
Int. Cl. C23f 13/00
U.S. Cl. 204—147                 8 Claims

ABSTRACT OF THE DISCLOSURE

Method and apparatus for protecting walls of a metal vessel against corrosion. The walls are connected in an electric circuit which makes their outside surfaces a cathode and their inside surfaces an anode. Effective for vessels in contact with the ground and containing an acid or caustic solution.

---

This invention relates to an improved method and apparatus for protecting the walls of a metal vessel against corrosion.

Although my invention is not thus limited, the method and apparatus are particularly useful for protecting the walls of vessels which contact the ground and contain oxidizing electrolytes, such as some acids or caustic solutions. It is well know that the walls of vessels exposed to certain electrolytes can be protected against corrosion by "cathodic control"; that is, the walls are connected in an electric circuit in which the exposed surface becomes a cathode. Commonly this method is used to protect the outer surface of vessels which are in contact with damp earth. With certain combinations of metals and oxidizing electrolytes, it is known further that the walls can be protected by "anodic control"; that is, a corrosion-resistant film forms on the surface exposed to the electrolyte when the metal is connected in a circuit in which its exposed surface becomes an anode. Nevertheless, as far as I am aware, the two principles never have been combined to afford protection to both the outside and inside surfaces of vessel walls.

An object of the present invention is to provide an improved method and apparatus for protecting the walls of a metal vessel against corrosion in which I simultaneously protect the outside surface by cathodic control and the inside surface by anodic control.

A further object is to provide a method and apparatus for accomplishing the foregoing objective in which I connect the vessel in a single circuit such that the outside surface of its walls becomes a cathode and the inside surface an anode, and in which I control the potentials to afford optimum protection.

In the drawing:

The single figure is a diagrammatic vertical sectional view of a vessel to which is connected my apparatus for protecting the walls against corrosion.

The figure shows a metal vessel 10, commonly steel, which contacts an exterior electrolyte 12 and contains an interior electrolyte 13. Usually the exterior electrolyte is ground or damp earth, or it may be natural or marine water. The interior electrolyte may be any liquid which enables a passive film to form on the inside surface of the vessel when this surface is connected to become an anode at the proper potential, as hereinafter explained. Examples are carbon steel with sulfuric acid, super phosphoric acid, aqueous ammonia, or aqueous ammonium nitrate, and stainless steel with sulfuric acid, phosphoric acid, ammonium nitrate solutions, aluminum sulfate solutions, sodium hydroxide, sulfonic acid, or oxalic acid.

In accordance with my invention, I insert one or more inert anodes 14 within the exterior electrolyte 12, and connect these anodes to the positive output terminal of a conventional rectifier 15 via a conductor 16. I insert an inert cathode 17 within the interior electrolyte 13 and connect this cathode to the negative output terminal of the rectifier via a conductor 18. I connect the input terminals of the rectifier to a suitable power source 19. In this manner direct current flows from the positive output terminal of the rectifier 15 through conductor 16, anodes 14, exterior electrolyte 12, the walls of vessel 10, interior electrolyte 13, cathode 17 and conductor 18 to the negative output terminal of the rectifier. The outside surface of the vessel walls becomes a cathode and the inside surface an anode.

I use a conventional copper sulfate reference half-cell 20 and voltmeter 21 to measure the cathodic potential on the outside surface of the wall of vessel 10. The cell has a porous container 22 and a copper reference electrode 23. I place the porous container in contact with the exterior electrolyte 12, and I connect the reference electrode to the vessel wall through a conductor 24 and voltmeter 21. In the absence of any potential applied to the vessel wall via anodes 14, the voltmeter shows a potential of about minus 0.5 volt. The cathodic potential applied via the anodes should be sufficient to increase this reading in the negative direction to at least about minus 0.85 volt, measured to the same reference half-cell, to protect the outside surface against corrosion, but may exceed this value by a substantial margin.

Similarly I use a conventional saturated calomel half-cell 25, which contains a reference electrode 26, to measure the anodic potential on the inside surface of the wall of vessel 10. I place the half-cell 25 within the interior electrolyte 13. It is necessary to control the anodic potential more closely than the cathodic potential; hence I prefer to use a potential controller 27 in place of a voltmeter for measuring and controlling the anodic potential. The controller has reference terminals which I connect to the reference electrode 26 and to the wall of vessel 10 via conductors 28 and 29 respectively. The controller also has input terminals, which I connect to a power source 30, and main terminals, which I connect to the wall of vessel 10 and to the negative terminal of the rectifier 15 via conductors 31 and 32 respectively. I set the controller to the anodic potential I wish to maintain on the inside surface of the vessel wall. If the current which flows from anodes 14 produces too great a potential, the controller automatically shunts current from the vessel wall to the rectifier 15. If the potential is too low, the controller automatically supplies current from the power source 30. Suitable controllers which operate in this manner are known and available commercially.

The magnitude of the anodic potential which forms a corrosion-resistant film on the inside surface of a vessel wall varies with different combinations of metal walls and interior electrolytes. The extremes, as measured to a calomel half-cell, are about 0 to plus 2 volts, but the optimum for any particular combination must be determined individually. Generally the potential must be controlled to within about 0.2 volt. The potential is higher for caustic solutions than for acids. In many instances it is of course possible to obtain the proper potential without the potential controller, and I can substitute a simple voltmeter, as in the cathodic portion of the circuit.

As an example to demonstrate how my invention operates, I partially submerged a 6-inch diameter carbon-steel cylinder in wet cinders and poured a 67-percent sulfuric acid solution into the cylinder. I connected the cylinder as shown in the drawing, but without the potential controller. The outside surface of the cylinder wall was cathodically protected against corrosion by a steel-to-cinders potential greater than minus 0.85 volt (measured to a copper sulfate reference half-cell). Simultaneously the inside surface was anodically protected by a predetermined steel-to-acid potential of plus 1.120 volts (measured to a saturated calomel reference half-cell).

From the foregoing description and example, it is seen that my invention affords a simple effective method and apparatus for simultaneously protecting both sides of the walls of a metal vessel both cathodically and anodically. In this manner I protect the vessel wall against corrosion both on the outside and inside surfaces with a single electric circuit.

While I have shown and described certain preferred embodiments of my invention, it is apparent that other modifications may arise. Therefore, I do not wish to be limited to the disclosure set forth but only by the scope of the appended claims.

I claim:

1. A method of protecting the walls of a metal vessel against corrosion, said walls having outside and inside surfaces which contact exterior and interior electrolytes respectively, said method comprising passing an electric current through an inert anode within said exterior electrolyte, and thence through said exterior electrolyte, said walls, and said interior electrolyte to an inert cathode within said interior electrolyte, said current producing a cathodic potential of at least about minus 0.85 volt at the outside surface of said walls as measured to a copper sulfate reference half-cell, and an anodic potential of about 0 to plus 2 volts at the inside surface as measured by a saturated calomel reference half-cell, said anodic potential forming a protective film on the inside surface in the presence of said interior electrolyte.

2. A method as defined in claim 1 in which said exterior electrolyte is moist earth.

3. A method as defined in claim 1 in which said interior electrolyte is oxidizing.

4. A method as defined in claim 1 in which the anodic potential is controlled by shunting excess current from the vessel wall or introducing current to the vessel wall from a supplemental supply.

5. The combination with a metal vessel, whose walls have inside and outside surfaces, and an exterior electrolyte in contact with said outside surface, said vessel being adapted to contain an interior electrolyte in contact with said inside surface, of an apparatus for preventing corrosion of the vessel walls, said apparatus comprising a source of direct current, an inert anode connected to said source and being located within said exterior electrolyte, and an inert cathode connected to said source and being located within said vessel where it may be immersed in the interior electrolyte, said source being of a magnitude to produce a cathodic potential of at least about minus 0.85 volt at the outside surface of the walls as measured to a copper sulfate reference half-cell, and an anodic potential of about 0 to plus 2 volts at the inside surface as measured to a saturated calomel reference half-cell, to form a protective film on the latter surface in the presence of said interior electrolyte.

6. A combination as defined in claim 5 in which said exterior electrolyte is damp earth.

7. A combination as defined in claim 5 in which said interior electrolyte is oxidizing.

8. A combination as defined in claim 5 further comprising control means connected to said vessel wall for regulating the anodic potential, said control means being adapted to shunt excess current from said wall or to supply any deficiency needed to maintain the potential at a set value.

References Cited

UNITED STATES PATENTS

| | | | |
|---|---|---|---|
| 1,842,541 | 1/1932 | Cumberland | 204—196 |
| 2,903,405 | 9/1959 | Sabins | 204—196 |
| 3,208,925 | 9/1965 | Hutchison et al. | 204—147 |
| 3,345,278 | 10/1967 | Mekjean | 204—196 |

OTHER REFERENCES

"National Bureau of Standards, Circular # 579," p. 180, 1957.

HOWARD S. WILLIAMS, Primary Examiner
T. TUNG, Assistant Examiner

U.S. Cl. X.R.
204—196, 268